(12) United States Patent  (10) Patent No.: US 8,725,406 B2
Kitajima  (45) Date of Patent: May 13, 2014

(54) MOBILE COMMUNICATION TERMINAL AND MAP DISPLAY SYSTEM

(75) Inventor: Jiro Kitajima, Yokohama (JP)

(73) Assignee: Kyocera Corporation, Kyoto (JP)

( * ) Notice: Subject to any disclaimer, the term of this patent is extended or adjusted under 35 U.S.C. 154(b) by 443 days.

(21) Appl. No.: 11/147,824

(22) Filed: Jun. 7, 2005

(65) Prior Publication Data

US 2005/0288854 A1  Dec. 29, 2005

(30) Foreign Application Priority Data

Jun. 24, 2004  (JP) ................................. 2004-186370

(51) Int. Cl.
*G01C 21/00*  (2006.01)

(52) U.S. Cl.
USPC ..................... 701/408; 455/550.1; 455/456.1; 455/425; 455/446

(58) Field of Classification Search
USPC ............... 701/202, 209, 211, 212; 455/550.1, 455/456.1, 425, 446
See application file for complete search history.

(56) References Cited

U.S. PATENT DOCUMENTS

| | | | | |
|---|---|---|---|---|
| 4,873,513 | A * | 10/1989 | Soults et al. ..................... | 345/27 |
| 5,388,248 | A * | 2/1995 | Robinson et al. ................ | 365/52 |
| 6,202,022 | B1 * | 3/2001 | Ando ............................ | 701/400 |
| 6,338,020 | B2 * | 1/2002 | Hashimoto ................... | 701/409 |
| 6,484,093 | B1 * | 11/2002 | Ito et al. ........................ | 701/420 |
| 6,532,417 | B2 * | 3/2003 | Hatano ......................... | 701/420 |
| 6,584,402 | B2 | 6/2003 | Fukushima et al. | |
| 6,738,711 | B2 * | 5/2004 | Ohmura et al. ............... | 701/451 |
| 6,885,938 | B2 * | 4/2005 | Machii et al. ................. | 701/421 |
| 6,937,936 | B2 * | 8/2005 | Nimura ......................... | 701/421 |
| 6,941,220 | B2 * | 9/2005 | Le et al. ........................ | 701/419 |
| 6,947,837 | B2 | 9/2005 | Fukushima et al. | |
| 2002/0145560 | A1 * | 10/2002 | Tsujimoto et al. ........ | 342/357.09 |
| 2003/0009394 | A1 * | 1/2003 | Malkin et al. ................... | 705/27 |

(Continued)

FOREIGN PATENT DOCUMENTS

| | | |
|---|---|---|
| JP | 10-197258 | 7/1998 |
| JP | 2000-213952 | 8/2000 |

(Continued)

OTHER PUBLICATIONS

Japanese language decision of rejection dated Feb. 14, 2012 and its English language translation issued in corresponding Japanese application 2004186370.

(Continued)

*Primary Examiner* — Redhwan K Mawari
(74) *Attorney, Agent, or Firm* — DLA Piper LLP (US)

(57) ABSTRACT

A map display system has a server and a mobile communication terminal connected via a communication network. The communication terminal has a storage device for storing advance map data associated with position data; a position measurement device for measuring a present position and obtaining position present position data; a present map data obtaining device for obtaining present map data from the server via the communication network by sending the server the present position data; an instruction device for issuing an instruction for map display; and a display device for displaying a map based on either the present map data or the advance map data. The server has a storage device for storing map data; and a map providing device for searching the stored map data in accordance with the position data sent from the mobile communication terminal and sending the mobile communication terminal map data corresponding to the position data.

29 Claims, 8 Drawing Sheets

(56) References Cited

U.S. PATENT DOCUMENTS

| | | | |
|---|---|---|---|
| 2003/0023375 A1* | 1/2003 | Yoshida | 701/212 |
| 2003/0074135 A1* | 4/2003 | Watanabe et al. | 701/209 |
| 2003/0182052 A1* | 9/2003 | DeLorme et al. | 701/201 |
| 2004/0203897 A1* | 10/2004 | Rogers | 455/456.1 |
| 2004/0203998 A1* | 10/2004 | Knauerhase et al. | 455/550.1 |
| 2005/0043884 A1* | 2/2005 | Atarashi | 701/202 |
| 2005/0288854 A1* | 12/2005 | Kitajima | 701/208 |

FOREIGN PATENT DOCUMENTS

| | | |
|---|---|---|
| JP | 2001109764 A | 4/2001 |
| JP | 2001147121 A | 5/2001 |
| JP | 2002-323324 | 11/2002 |
| JP | 2002-328042 | 11/2002 |
| JP | 2002-340577 | 11/2002 |
| JP | 2002328598 A | 11/2002 |
| JP | 2002334226 A | 11/2002 |
| JP | 2002350160 A | 12/2002 |
| JP | 2003044990 A | 2/2003 |
| JP | 2003075176 A | 3/2003 |
| JP | 2003075179 A | 3/2003 |
| JP | 2003075180 A | 3/2003 |
| JP | 2003254759 A | 9/2003 |
| JP | 2004-028837 | 1/2004 |
| JP | 2004108803 A | 4/2004 |
| JP | 2004340854 A | 12/2004 |

OTHER PUBLICATIONS

Japanese language office action (notice of reasons for rejection) dated May 31, 2011 and its English language translation for corresponding Japanese application 2004186370 cites the foreign patent documents above.

Japanese language office action dated Apr. 3, 2012 and its English language translation issued in corresponding Japanese application 2011168534 cites the foreign patent documents above.

Japanese language office action dated Feb. 21, 2012 and its English language translation issued in corresponding Japanese application 2009127337 cites the foreign patent documents listed above.

Japanese language office action dated Nov. 6, 2012 and its English language translation issued in corresponding Japanese application 2009127337 cites the foreign patent document listed above.

Japanese language office action dated Jun. 29, 2010 and its English language translation for corresponding Japanese application 2004186370 lists the references above.

* cited by examiner

MOBILE COMMUNICATION TERMINAL AND MAP DISPLAY SYSTEM

BACKGROUND OF THE INVENTION

1. Field of the Invention

The present invention relates to a mobile communication (or communications) terminal such as a cellular (or mobile) phone for showing map data in accordance with position data, and relates to a map display system including the mobile communication terminal and a server for storing map data.

Priority is claimed on Japanese Patent Application No. 2004-186370, filed Jun. 24, 2004, the content of which is incorporated herein by reference.

2. Description of Related Art

FIG. 9 is a block diagram showing a conventional map display system using a cellular phone, FIG. 10 is a flowchart showing the operation of this system.

With reference to these figures, the cellular phone 10 having a GPS (Global Positioning System) function acquires and communicates with GPS satellites 20, and computes data of the present position (i.e., the present position data). The cellular phone 10 then confirms whether it is possible to access a map data service server 40 via a wireless base station 30. If it is possible, the cellular phone 10 determines whether map data corresponding to the position data is stored in a database of the map data service server 40. If corresponding map data is stored, the cellular phone downloads and displays the data. In addition, the database of the map data service server 40 also stores data for route search or route guidance based on position data and destination data, and similarly, the stored data can be appropriately downloaded in accordance with movement of the cellular phone 10.

In addition, there are known devices or systems such as (i) a portable terminal for implementing a navigation function without using a position detection device (see, for example, Japanese Unexamined Patent Application, First Publication No. 2004-028837), (ii) a navigation system having no storage medium for map data (see, for example, Japanese Unexamined Patent Application, First Publication No. H10-197258), and (iii) a navigation system performing route guidance data retrieval by using a portable communication device in a standby state (see, for example, Japanese Unexamined Patent Application, First Publication No. 2002-328042). Typically, portable terminals used in the conventional navigation systems use an electronic compass having a geomagnetic sensor in order to measure a direction or an azimuth.

In the conventional map display system shown in FIG. 9, for the cellular phone 10 to obtain and display map data or route data from the map data service server 40, the cellular phone 10 must be present within the service areas of the wireless base stations 30. Generally, positional detection using the GPS function should be possible in an open air environment (such as on the top of a mountain) where signals from the GPS satellites 20 are acquirable. However, in mobile communication, each service area is generally defined in a place having a large population (i.e., having a large number of buildings where signals from the GPS satellites 20 cannot be easily acquired), and in most cases, the mobile communication service cannot be used in a place such as the top of a mountain (where signals from the GPS satellites 20 can be easily acquired). In addition, signals from the GPS satellites 20 may be acquired in foreign countries. However, some mobile communication service providers do not provide service in foreign countries, and in this case, map data or route data cannot be obtained from the map data service server 40.

SUMMARY OF THE INVENTION

In view of the above circumstances, an object of the present invention is to provide a mobile communication terminal and a map display system by which, even when a user is in an unfamiliar place and is out of the service area, in a foreign country or the like, a map of a nearby area can be displayed.

Therefore, the present invention provides a mobile communication terminal comprising:

a storage device for storing map data, which is associated with position data, as advance map data in advance;

a position measurement device for measuring a present position and obtaining position data of the present position as present position data;

a present map data obtaining device for requesting and obtaining present map data relating to the present position data via a communication network;

an instruction device for issuing an instruction for map display; and a display device for displaying a map based on either the present map data or the advance map data in accordance with the instruction.

In a typical example, when the instruction for map display is issued from the instruction device, if the present map data obtaining device can access the communication network, then the present map data is requested and obtained, and a map based on the present map data is displayed by the display device.

In another typical example, when the instruction for map display is issued from the instruction device, if the present map data obtaining device cannot access the communication network, then a map based on the advance map data stored in the storage device is displayed by the display device.

The mobile communication terminal may further comprise a position designating device for designating a desired position, wherein the storage device is searched for map data relating to the designated position, and a map based on the map data retrieved from the storage device is displayed by the display device.

Preferably, when a start point and a destination are designated by the position designating device, the storage device is searched for map data indicating a travel route from the start point to the destination, and a map based on the map data retrieved from the storage device is displayed by the display device.

It is possible that when the map data relating to the designated position is not retrieved, map data relating to a position which is close to the designated position is searched for, and a map based on the map data retrieved from the storage device is displayed by the display device.

In another typical example, wherein when the instruction for map display is issued from the instruction device, if no advance map data is stored in the storage device and the present map data obtaining device can access the communication network, the present map data is requested and obtained, and a map based on the present map data is displayed by the display device.

The position measurement device may measure the present position in accordance with the instruction for map display, issued from the instruction device.

The mobile communication terminal may further comprise:

a position designating device for designating a desired position; and an advance map data obtaining device for obtaining the advance map data by requesting and obtaining map data relating to the designated position in advance via a communication network.

The present map data obtaining device and the advance map data obtaining device may constitute a single data obtaining device.

The advance map data obtaining device may obtain the advance map data by designating at least one of a place name, a station name, an airport name, and a facility name.

Similarly, the present map data obtaining device may obtain the present map data by designating at least one of a place name, a station name, an airport name, and a facility name.

In a preferable example, when a start point and a destination are designated by the position designating device, the advance map data obtaining device obtains the map data indicating a travel route from the start point to the destination, and the obtained map data is stored as the advance map data in the storage device.

The present invention also provides a map display system in which a server having map data and a mobile communication terminal for obtaining the map data are connected via a communication network, wherein:

the mobile communication terminal comprises:

a first storage device for storing map data, which is associated with position data, as advance map data in advance;

a position measurement device for measuring a present position and obtaining position data of the present position as present position data;

a present map data obtaining device for requesting and obtaining present map data relating to the present position data from the server via the communication network by sending the server the present position data as position data;

an instruction device for issuing an instruction for map display; and a display device for displaying a map based on either the present map data or the advance map data in accordance with the instruction, and the server comprises:

a second storage device for storing map data; and a map providing device for searching the stored map data in accordance with the position data sent from the mobile communication terminal and sending the mobile communication terminal map data corresponding to the position data.

It is possible that:

when a start point and a destination are designated by the mobile communication terminal, the server computes a travel route from the start point to the destination and sends the mobile communication terminal the travel route as the map data; and the mobile communication terminal receives the map data and stores the received map data as the advance map data into the first storage device.

Preferably, the server adjusts the map data to be sent to the mobile communication terminal in a manner such that a size of the map data does not exceed a predetermined value. In this case, the size of the map data may be adjusted by controlling a scale of the map data.

In the map display system, the mobile communication terminal may further comprise:

a position designating device for designating a desired position; and an advance map data obtaining device for obtaining the advance map data by requesting and obtaining map data relating to the designated position from the server in advance via the communication network by sending position data relating to the designated position to the server.

Preferably, when map data requested by the advance map data obtaining device is not stored in the second storage device, the server retrieves map data relating to a position which is close to the designated position and sends the retrieved map data to the mobile communication terminal.

According to the present invention, even when a user of the wireless communication terminal is out of the service area of relevant wireless base stations, a map of a nearby area of a desired position such as a destination or a travel route to a destination can be displayed on the display device of the wireless communication terminal.

DETAILED DESCRIPTION OF THE INVENTION

Figure 1:
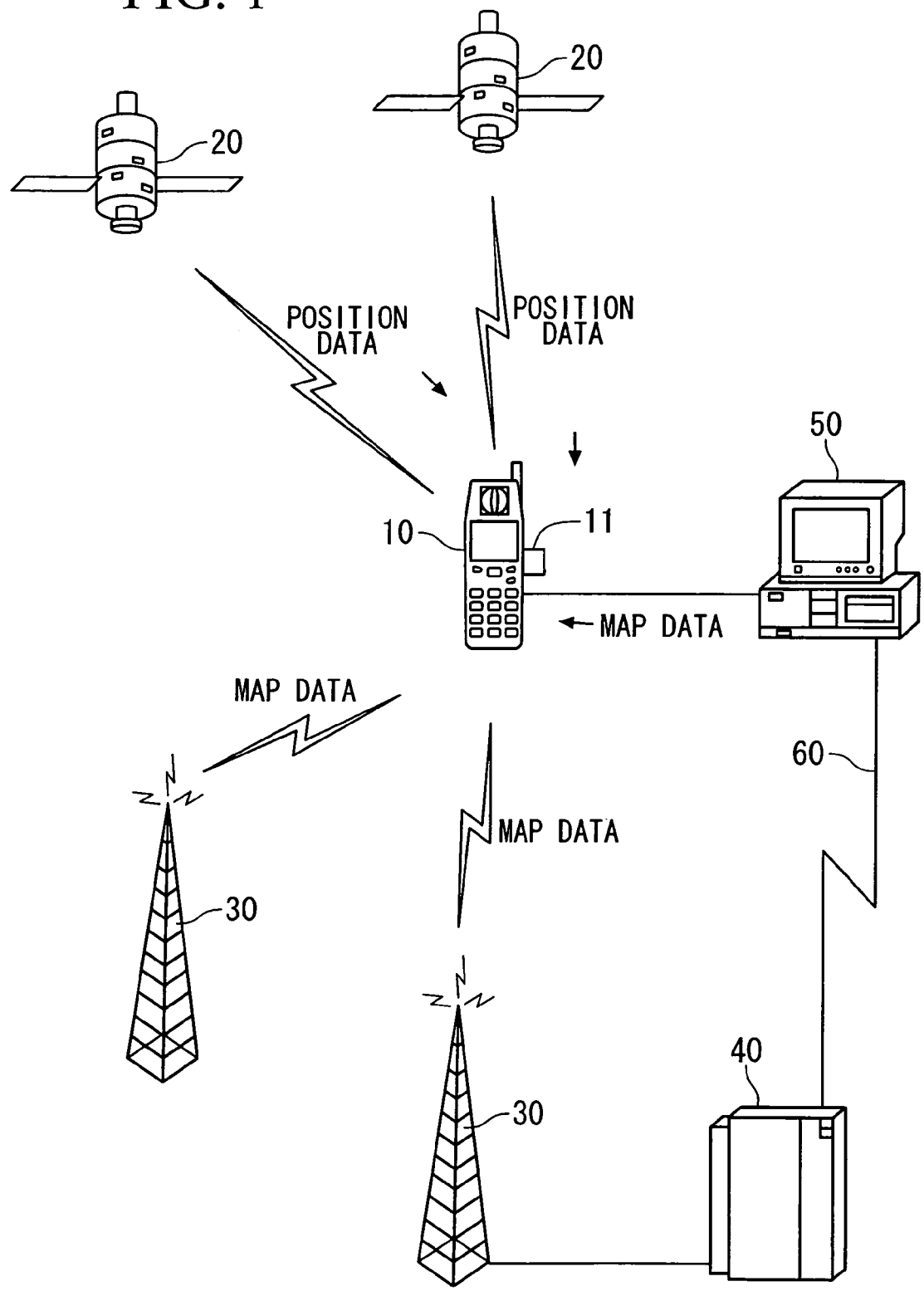
FIG. 1 is a diagram showing the structure of the map display system as an embodiment according to the present invention.

Hereinafter, an embodiment according to the present invention will be explained with reference to the drawings. In the embodiment, the present invention is applied to a multifunctional cellular (or mobile) phone which has a navigation function using GPS (Global Positioning System), and the like. FIG. 1 is a diagram showing the structure of the map display system having the cellular phone of the embodiment, for displaying geographical position and map data.

In FIG. 1, reference numeral 10 indicates a multifunctional cellular phone having a function of measuring the present position using GPS satellites, a navigation function, etc. The cellular phone 10 has a detachable external memory 11 (explained later with reference to FIG. 2). Reference numerals 20 indicate GPS satellites, and reference numerals 30 indicate wireless base stations for performing wireless communication (or communications) with the cellular phone 10. Reference numeral 40 indicates a map data service server which has a database for storing map data and provides the map data to the cellular phone 10. Reference numeral 50 indicates a personal computer (PC) connected to the cellular phone 10, and reference numeral 60 indicates a communication network such as the Internet. The PC 50 can connect with the map data service server 40 or the like, via the Internet 60.

When the cellular phone 10 requests the map data service server 40 to provide map data related to a plurality of destinations, the map data service server 40 generates map data of a single scaled map which includes all areas relating to the destinations and sends the generated map to the cellular phone 10. Accordingly, the cellular phone 10 can display the scaled map data on a single display screen (i.e., a data display section 16 as explained below).

In the example shown in FIG. 1, the user first designates some desired positions (or places), and downloads map data for an area in the vicinity of each designated position, from the map data service server 40 which the cellular phone 10 can access, or another map data service source (which the cellular phone 10 can access) for providing map data. The user stores the downloaded data in advance (of its use) in the external memory 11 as advance map data, or obtains an external memory 11 in which the advance map data are stored in advance and inserts the external memory 11 into the cellular phone 10.

When the user comes a certain position and operates the cellular phone 10 so as to start navigation (i.e., commands map display), the cellular phone 10 measures the present position by using the GPS function, and retrieves and extracts map data corresponding to the present position (i.e., present map data) from among the advance map data stored in the external memory 11.

Accordingly, in the present embodiment, map data is obtained in advance; thus, even for a user who is in a foreign country and is out of the service area, a map in the vicinity of a designated position can be extracted from the stored advance map data and be displayed.

Figure 2:
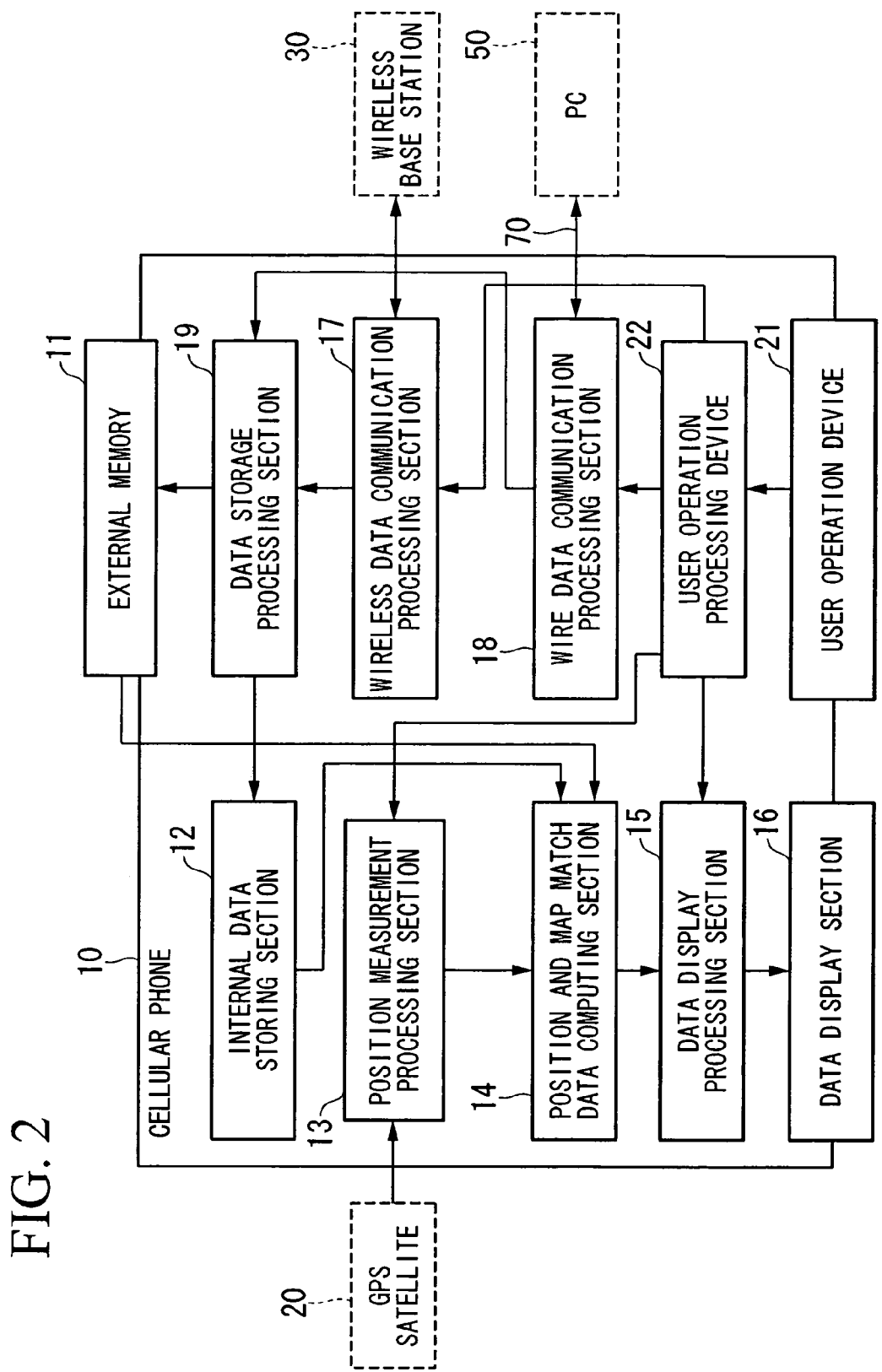
FIG. 2 is a block diagram showing the structure of the cellular phone as an embodiment according to the present invention.

The cellular phone 10 will be explained in more detail below. FIG. 2 is a block diagram showing the structure of the cellular phone 10.

In the figure, the external memory 11 is a detachable memory device such as a card memory, having a flash memory or the like. The external memory 11 is detachably attached to the body of the cellular phone 10 and used for storing in advance the advance map data acquired from the map data service server 40 or another map data source.

Reference numeral 12 indicates an internal data storing section (i.e., an internal memory) for storing necessary data, and reference numeral 13 indicates a position measurement processing section for measuring the present position by using the GPS satellites 20 so as to obtain position data. The position measurement processing section 13 measures the present position by using signals received by a GPS antenna (not shown) from three or more GPS satellites 20, according to differences between delay times of the received signals based on triangulation.

Reference numeral 14 indicates a position and map match data computing section. Based on position data of the present position measured by the position measurement processing section 13, the position and map match data computing section 14 searches the external memory 11 for advance map data corresponding to the position data. Reference numeral 15 indicates a data display processing section for performing a process of displaying the extracted advance map data, and reference numeral 16 indicates a data display section such as a liquid crystal display or the like, for displaying a map based on the map data, a menu display, or the like.

Reference numeral 17 indicates a wireless data communication processing section for performing wireless communication with the map data service server 40 or another server via any wireless base station 30, or, with another cellular phone, based on the CDMA (Code Division Multiple Access) method or the like. The cellular phone 10 has an antenna (not shown) for performing the wireless data communication. The wireless data communication processing section 17 always checks the states of a plurality of nearby base stations and monitors the strength of the signal from each base station, so as to implement the "soft hand-off" function of CDMA.

Reference numeral 18 indicates a wire data communication processing section for performing wire data communication with the PC 50 and obtaining map data which is downloaded onto the PC 50 from the map data service server 40. Reference numeral 19 indicates a data storage processing section for storing the map data, obtained by the wireless data communication processing section 17 and the wire data communication processing section 18, into the external memory 11.

Reference numeral 21 indicates a user operation device by which the user commands the cellular phone 10 to start navigation or performs other operations by key input or the like. Reference numeral 22 indicates a user operation processing device. Based on the operation of the user using the user operation device 21, the user operation processing device 22 makes an appropriate section (i.e., a process block) execute a specific process.

Each processing section is realized by memory, a CPU (Central Processing Unit), and the like, and a program (not shown) for executing a specific function assigned to each processing section is loaded into memory and is executed, thereby executing the function. The cellular phone 10 also includes an electronic compass (not shown) for measuring a direction or an azimuth.

Figure 3:
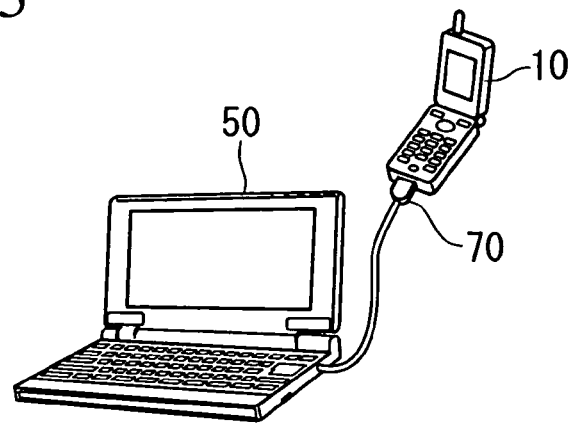
FIG. 3 is a perspective view showing a connection state between the PC and the cellular phone in the embodiment.

FIG. 3 is a perspective view showing a connection state between the PC 50 and the cellular phone 10. As shown in the figure, the PC 50 and the cellular phone 10 are connected to each other via a cable 70 which is adapted to a standard such as USB (Universal Serial Bus).

Figure 4:
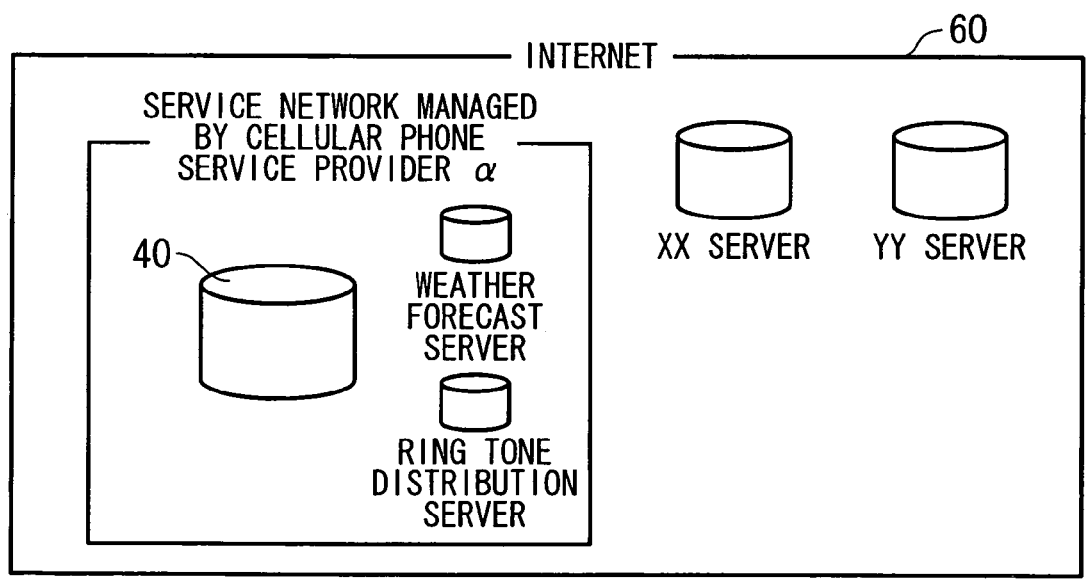
FIG. 4 is a diagram showing a representation of the structure of the Internet.

FIG. 4 is a diagram showing a representation of the structure of the Internet. As shown in the figure, the map data service server 40 belongs to a service network managed by a cellular phone service provider α. In order to provide various services to users, the cellular phone service provider α also possesses other servers such as a weather forecast server for distributing weather forecast data or a ring tone distribution server for distributing melody data used for ring tones for cellular phones. On the Internet 60, various servers managed by other cellular phone service providers (other than the servers on the above service network) are also present.

The operation of the cellular phone 10 having the above structure will be explained. First, normal navigation operation performed when the map data service server 40 can be accessed will be explained with reference to FIGS. 1 and 2.

When the user operates the user operation device 21 so as to instruct start of navigation, the cellular phone 10 receives wireless signals from three or more GPS satellites 20 and performs measurement of the present position based on the received signals. The computation for this measurement requires much computation power and generates a measurement error. Therefore, the first measurement may be performed by sending a DGPS (Differential GPS) server (not shown) the data for measurement which are obtained by the GPS satellites 20, so as to have the DGPS server perform data correction and obtain the corrected data from the DGPS server. However, if the position measurement processing section 13 (i.e., the CPU of this section) has a high processing ability, the cellular phone 10 may independently perform the computation for position measurement by itself.

When obtaining position data, the cellular phone 10 informs the map data service server 40 of the position data and requests the server 40 to provide map data of an area (e.g., 1 km square) relating to the position data. The map data of the map data service server 40 is then searched for a map of the area to which the received position data belongs. The cellular phone 10 downloads map data retrieved from the map data service server 40 and stores the data in the external memory 11. Based on the obtained map data, a map on which the present position is marked is displayed on the data display section 16. On the display, the whole map corresponding to all the obtained data is not shown but only a relatively small area around the position of the cellular phone 10 is shown.

After that, when the cellular phone 10 is moved, the position measurement processing section 13 computes the direction and the amount of the movement based on (i) variations in the signals from three or more GPS satellites 20 or variations in the strengths of electromagnetic wave signals from three or more base stations 30, and (ii) an azimuth measured by the electronic compass, or the like. In accordance with the movement, an updated map of a relatively small area around the position of the cellular phone 10 (displayed at the center of the map) is similarly prepared and displayed on the data display section 16. That is, instead of displaying a map of the whole area corresponding to the obtained data and shifting the marked position within the map, a relatively small area around the position of the cellular phone 10 is selected from the whole area and displayed, and the displayed area is shifted depending on the movement of the cellular phone 10. When such movement is continuously performed and it is determined that the displayed area has reached an end of the whole map data, the map data service server 40 is requested to provide map data of an adjacent area, which is downloaded and similar operations are performed.

Below, the navigation operation of the cellular phone 10 will be further explained in a specific example.

When the execution of a software program for performing navigation is commanded by the user operation device 21, an operation for specifying the present position of the cellular phone 10 is started. As explained above, position data can be computed by using the signals from three GPS satellites 20 (or by results of computation from a DGPS server if it is used), so that the present position of the cellular phone 10 is recognized by the position measurement processing section 13 as a start point. After a specific operation relating to the present position set as the start point, entering the destination (i.e., operation necessary for entering the destination) is possible. The user may be informed to a state in which entering is possible by a message on the data display section 16, such as "please set destination". During navigation, the position measurement processing section 13 continuously updates data which indicates the amount of movement from the start point, based on (i) azimuth data from the electronic compass, and (ii) variations in the strengths of electromagnetic wave signals from three base stations 30 (which the wireless data communication processing section 17 acquires) or variations in the signals from three GPS satellites 20.

Figure 5:
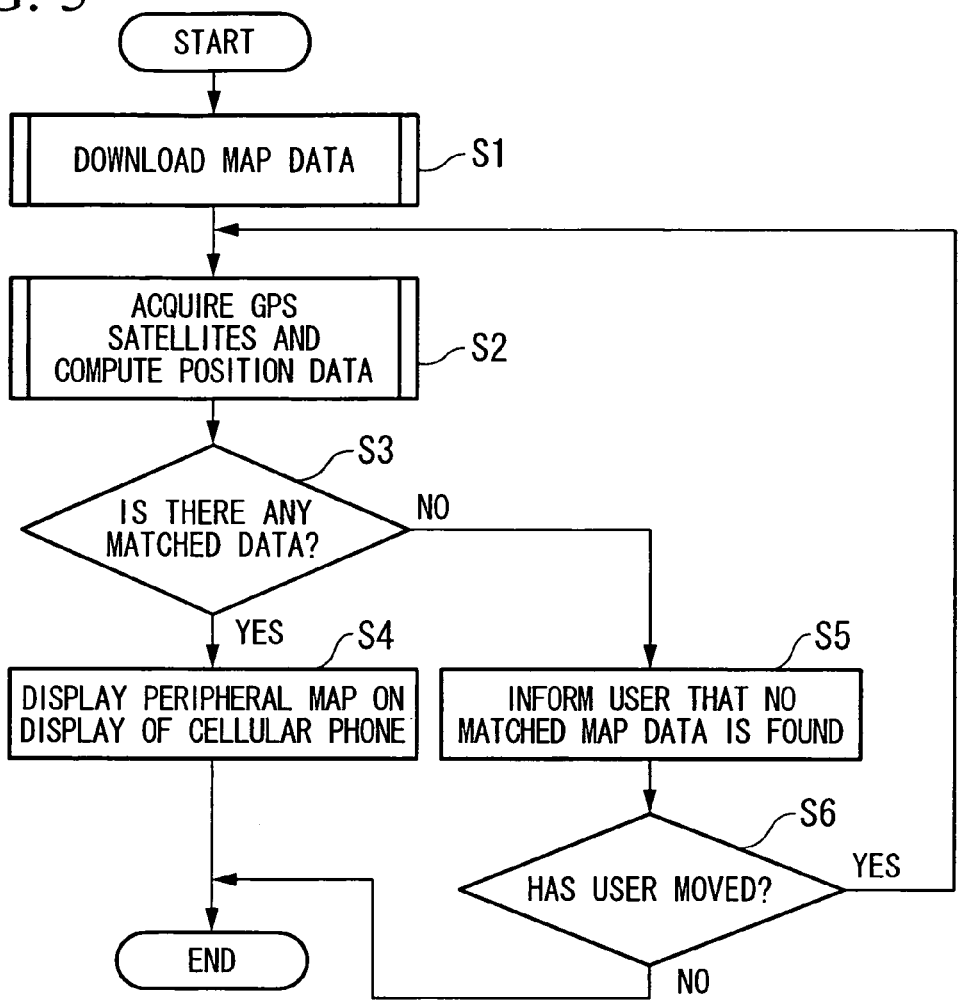
FIG. 5 is a flowchart showing the general operation of the embodiment.

Next, the operation of the present embodiment will be explained with reference to the flowchart in FIG. 5.

Acquiring Advance Map Data

First, when the user designates one or more desired positions (or places) by operating the user operation device 21, the wireless data communication processing device 17 requests advance map data from the map data service server 40 by way of the base station 30. The map data service server 40 searches its database for advance map data corresponding to data of the designated position data and sends the retrieved data, which is received by the cellular phone 10 and stored in the external memory 11.

In another process, the user designates a position by operating the PC 50, and accesses the map data service server 40 via the Internet 60 so as to download the advance map data from the map data service server 40. The advance map data is further downloaded via the cable 70 (by which the PC 50 and the cellular phone 10 are connected) to the cellular phone 10 by the wire data communication processing section 18, and the downloaded advance map data is stored in the external memory 11 (see step S1).

Start Of Navigation (When The Map Data Service Server 40 Cannot Be Used)

When the user arrives at a place after obtaining the advance map data by the map data downloading operation, the user may start navigation by operating the user operation device 21 of the cellular phone 10 (i.e., commands map display). According to the instruction, the position measurement processing section 13 measures the present position by using the GPS satellites 20 and computes the position data (see step S2).

In the next step S3, based on the computed position data, the external memory 11 is searched for the desired advance map data. If advance map data which matches or includes the computed position data is found, a map as explained above, in which the present position is marked (i.e., a map of the vicinity of the present position), is displayed on the data display section 16 based on the advance map data (see step S4). Conversely, if advance map data which matches or includes the computed position data is not found, this state or result is communicated on the data display section 16 (see step S5).

When the user who has seen the above display (which indicates that no matched advance map data have been found) moves to another place which belongs to an area where the advance map data stored in the external memory 11 can be displayed (i.e., "YES" in step S6), the operation returns to step S2 and position measurement using the signals received from the GPS satellites 20 is performed again. In addition, while the user moves in the above specific area, a map showing an area smaller than the specific area is displayed and updated in turn in accordance with the user's movement, thereby displaying the updated map.

In a variation, if no advance map data which matches the position data is found in step S3, then in addition to displaying this state, the operation may be switched to the normal (i.e., conventional) navigating operation as explained above, so as to download the present position data. However, in this case, the cellular phone 10 should be present within a service area of the wireless base stations 30 and in an environment where the present position data can be downloaded.

In another variation, regardless of the presence or absence of appropriate advance map data, if the cellular phone 10 is within a service area of the wireless base stations 30 and can access a base station 30, the present position data may be downloaded and displayed by using the known navigation operation as explained above.

According to the above two variations, navigation can continue even when no advance map data which matches the position data is found.

Figure 6:
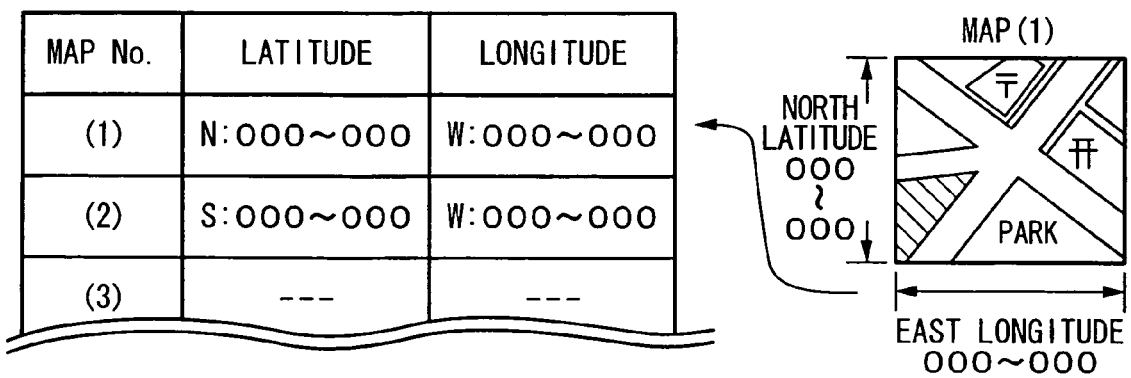
FIG. 6 is a diagram showing an example of the data structure of the advance map data.

FIG. 6 shows an example of the advance map data downloaded to the cellular phone 10. As shown in the figure, latitude and longitude ranges for defining each map are managed in correspondence with the map number of the map, so as to manage the map data in correspondence with the latitude and the longitude. The map data include position data such as place names, names of principal stations, airports, facilities, and the like, wherein the map data are managed using coordinates. In steps S3 and S4 in FIG. 5, the cellular phone 10 first measures the latitude and the longitude of the present position and then determines whether the measured latitude and longitude are present within any of the stored ranges of the latitude and longitude as shown in FIG. 6. If the measured latitude and longitude are present, a map based on map data of a specific area corresponding to the relevant ranges of the latitude and longitude is displayed.

In addition to the map data, the advance map data may include various local data such as data of local shops, transportation transfer information, sightseeing information, or the like.

Additionally, a plurality of advance map data may be prepared for different districts, countries, or the like, and respectively stored on a plurality of memory cards using the same data format. Such memory cards may be sold in convenience stores etc., or as additions to magazines, so that the user can purchase the memory card and attach this as the external memory 11 to the cellular phone 10. In this case, data of a convenience store chain where the user purchased the memory card may be added to the map data, or advertising information of the convenience store chain may be stored. In addition, stations belonging to an electric train company, which possesses a store which sold the memory card, may have priority in designation in transfer information which is provided by application software. Therefore, due to income from advertisements or the like, the selling price of the memory card itself can be reduced, so that the memory card can be easily circulated.

Regarding measurement of the latitude and the longitude by using the cellular phone 10, GPS electromagnetic wave signals may be received by the cellular phone 10 and correction and computation may be performed by using a DGPS server, as explained above. When the cellular phone 10 is a type applicable to this operation, then even in foreign roaming, the operation can be performed if there is a DGPS server which can be accessed. In addition, if the cellular phone 10 is a type for independently computing the latitude and the longitude after receiving the GPS electromagnetic wave signals, then position measurement and map display are possible in an environment in which the GPS satellites can be acquired but the electromagnetic wave signals from the wireless base stations cannot be acquired (e.g., in a place between mountains), that is, position measurement and map display are possible even when no DGPS server can be used.

Below, a process of downloading travel route data from the map data service server 40, performed in step S1 in FIG. 5, will be explained in detail with reference to the flowchart of FIG. 7.

In the flowchart, first, the user operates the user operation device 21 of the cellular phone 10 so as to instruct the cellular phone 10 to access Web sites on the Internet 60 (see step S11) and to connect with the map data service server 40 of a map data site (see step S12). After connection, the user inputs destination data to designate a destination by operating the user operation device 21 so as to obtain travel route data from the start (or departure) point (see step S13). The destination data may be a place name, a station name, an airport name, a facility name, or the like. As explained with reference to FIG. 6, data of places such as place names are managed in correspondence with map data which may be searched for. In addition, the place names or the like can be easily memorized by the user and thus be easily input.

The map data service server 40 then determines whether the input destination can be supported in the present site (see step S14). If it can be supported, the operation proceeds to step S17, while if it cannot be supported, the map data service server 40 extracts advance map data of a place whose coordinates or name are close to those of the input destination. The extracted advance map data is sent to the cellular phone 10. The cellular phone 10 which receives this advance map data displays a map based on the received advance map data on the data display section 16 (see step S15). The user then operates the user operation device 21 so as to designate a place (or position) as a destination on the displayed map of an area in the vicinity of the originally input destination, by moving a cursor which is superimposed on the map (see step S16).

The user then designates a start point (i.e., a departure point) by operating the user operation device 21 (see step S17). Data of the designated start point is sent to the map data service server 40. The map data service server 40 who receives the data of the start point determines whether this start point can be supported in the present site (see step S18). If it can be supported, the operation proceeds to step S21, while if it cannot be supported, then similar to step S16, advance map data for a place near to the designated start point is extracted and sent to the cellular phone 10, and the sent data is displayed (see step S19). The user then operates the user operation device 21 so as to designate a place (or a position) as a start point by moving a cursor which is superimposed on a map displayed on the data display section 16 (see step S20).

Next, in the map data service server 40, travel route data (i.e., a set of map data, which indicates a travel route) is searched for based on the start point and the destination designated by the cellular phone 10 (see step S21). The map data service server 40 then adjusts the scale of the relevant map so that the size of retrieved travel route data does not exceed a predetermined value (e.g., 1 Mbit) (see step S22). The travel route data having the adjusted scale is sent to the cellular phone 10, and the cellular phone 10 which received the data stores the received data to the external memory 11 (see step S23).

According to the above, when receiving the start point and the destination designated by the cellular phone 10, the map data service server 40 sends travel route data, which indicates a travel route from the start point to the destination, to the cellular phone 10 as advance map data, and the cellular phone 10 stores the advance map data in the external memory 11. Therefore, the user can obtain a displayed map from the start point to the destination based on the advance map data, anytime and anywhere the user is.

In addition, the scale of the map is adjusted according to the size of the travel route data; thus, desired travel route data can be accumulated even in an external memory 11 having a limited capacity.

After the travel route data is stored as advance map data in the external memory 11, travel route data indicating a travel route from the start point to the destination can be obtained from the external memory 11, not from the map data service server 40. That is, navigation can be performed even in an environment in which the map data service server 40 cannot be used.

When a map for navigation is searched for in step S21, the above-explained local data may be input. As the local data, various data such as sightseeing or mountaineering magazine data may be obtained from other servers.

Figure 7:
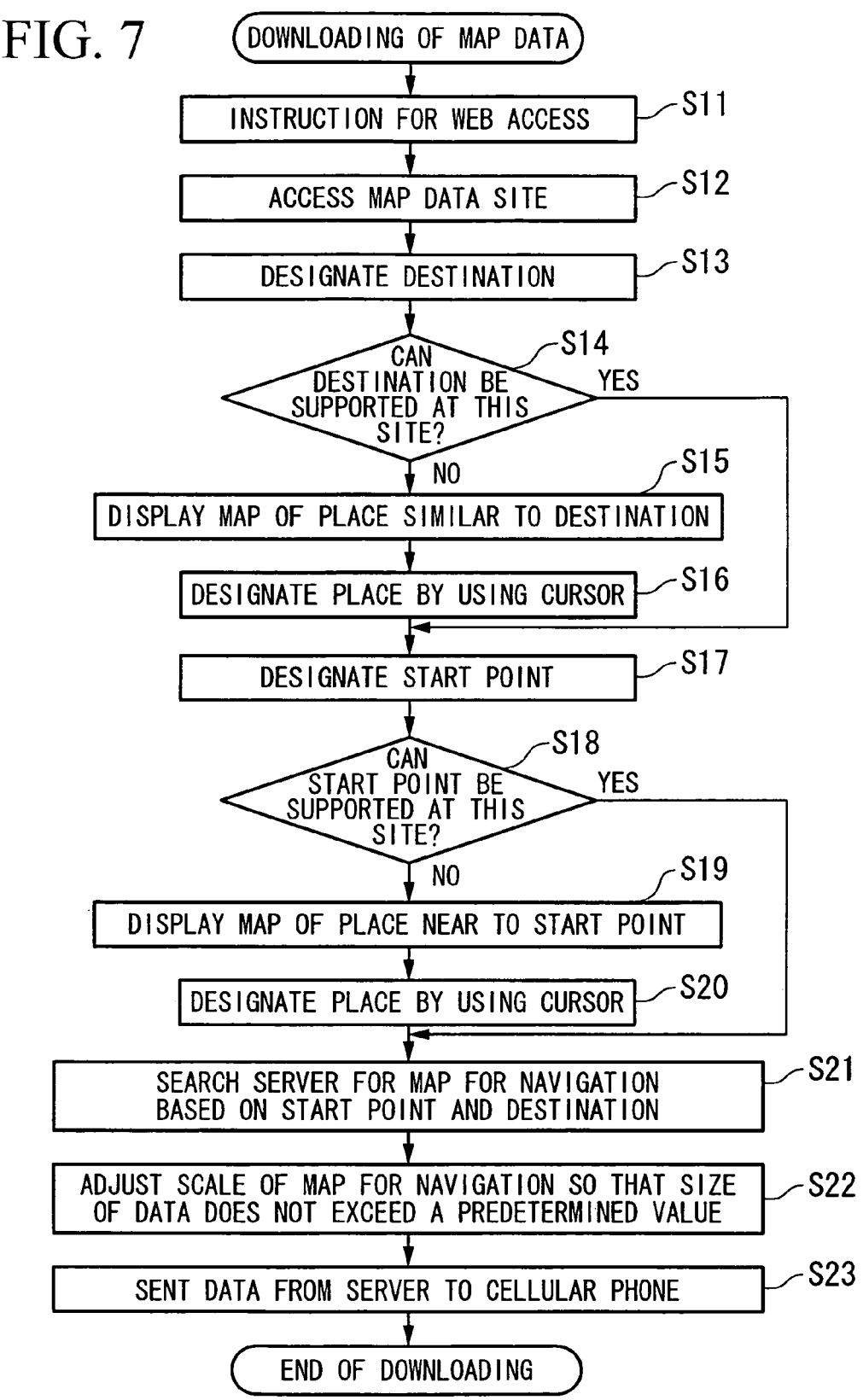
FIG. 7 is a flowchart showing the process of step S1 in FIG. 5.

In FIG. 7, an additional step may be inserted between the steps S11 and S12, so as to determine whether the cellular phone 10 is presently foreign roaming (i.e., out of the service area). If the result of the determination is NO, the operation may proceed to step S12, while if the result of the determination is YES, the operation may jump to step S2 in FIG. 5. Accordingly, the map (or a message indicating that relevant advance map data was not found) can be displayed more quickly.

Figure 8:
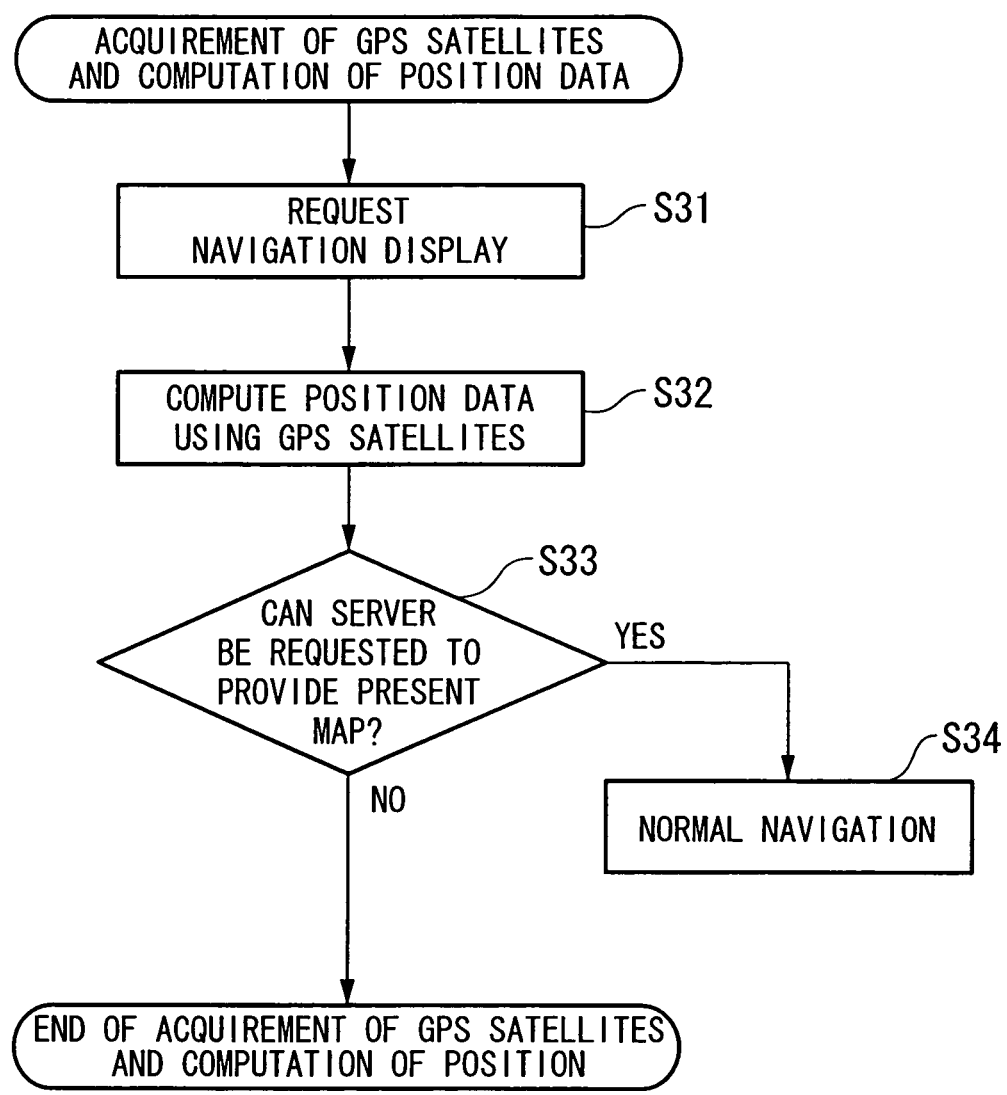
FIG. 8 is a flowchart showing the process of step S2 in FIG. 5.
Figure 9:
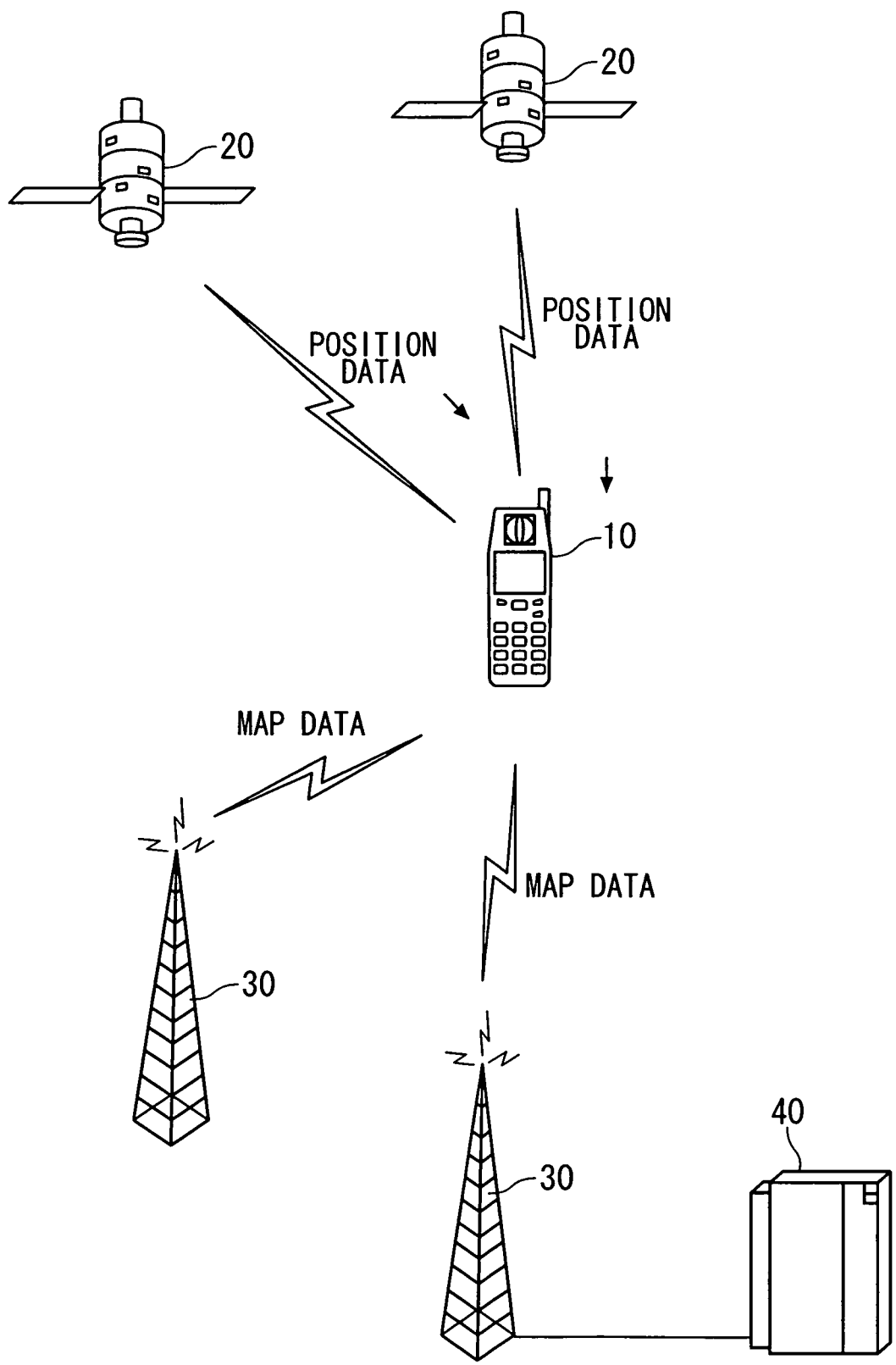
FIG. 9 is a diagram showing the structure of a conventional map display system.
Figure 10:
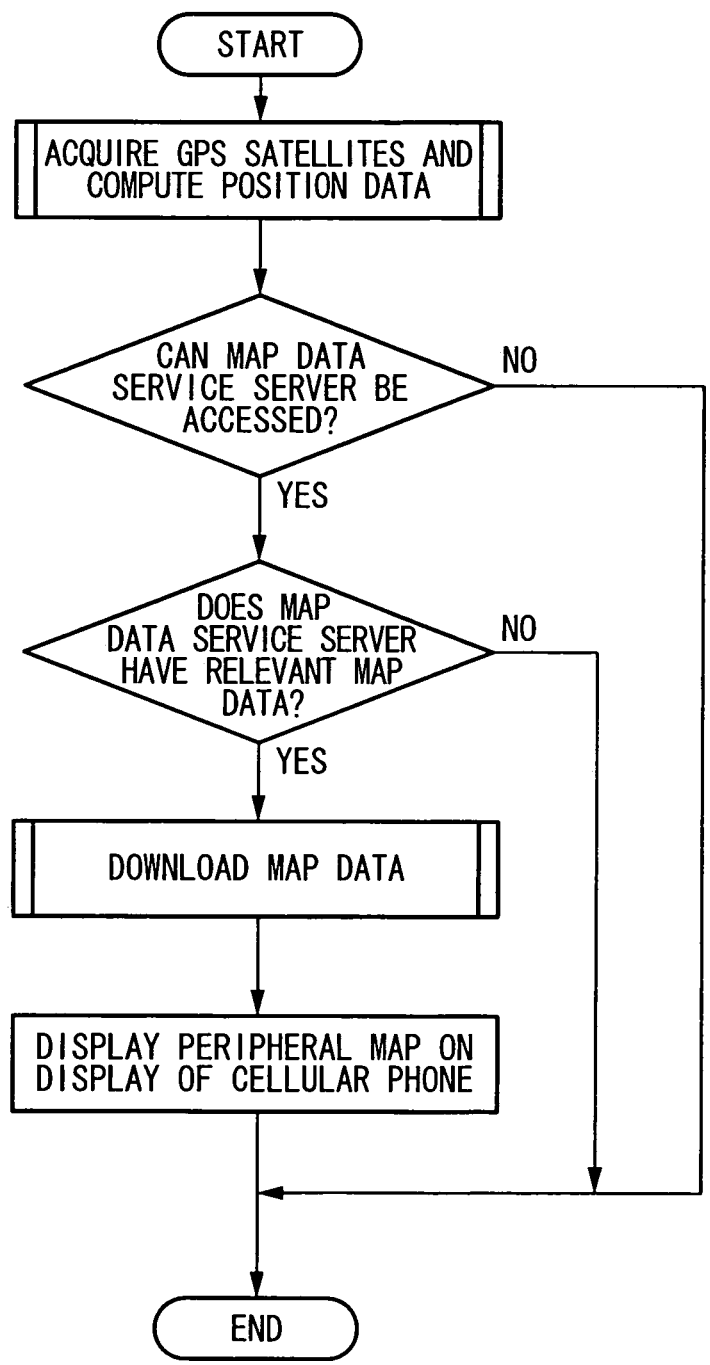
FIG. 10 is a flowchart showing the operation of the conventional map display system.

Below, the position data computing process using the GPS satellites in the cellular phone 10 will be explained. FIG. 8 is a flowchart for showing the position data computing process in step S2 in FIG. 5 in detail.

When a request for starting navigation is issued by using the user operation device 21 of the cellular phone 10 (see step S31), the position measurement processing section 13 performs position data computation by using the GPS satellites 20 (see step S32).

Based on the computed position data, it is determined whether the map data service server 40 can be requested to provide data of the present map (i.e., the map for the present position), that is, whether the map data service server 40 can be accessed (see step S33). If the map data service server 40 can be accessed, the above-explained operation of downloading the normal map data is performed, and the downloaded data is stored in the external memory 11 so as to perform normal navigation (see step S34). If the map data service server 40 cannot be accessed, the processes from step S3 in FIG. 5 are performed using advance map data which were stored in the external memory 11 in advance.

According to the above embodiment, advance map data are stored in advance in the cellular phone 10. Therefore, even when the user who possesses the cellular phone 10 is in a place out of the service areas of the wireless base stations 30, the user can input the present place and obtain and display a map of a peripheral area of the place by searching the stored advance map data. In addition, when the user designates a start point and a destination, a route to the destination can be displayed.

For example, when traveling in an unfamiliar foreign country, the user may access an overseas travel guidance site in advance by using a service network managed by the cellular phone service provider, so as to designate a principal station name in the country and download and store a map of the area around the station as advance map data, or may search for a travel route from the station to another principal station, and obtain the travel route defined on a plurality of maps. The user may also obtain relevant train transfer information. When the user arrives at the actual place, data corresponding to the place, such as the advance map data or the travel route data, can be retrieved and displayed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the mobile communication terminal of the present invention is not limited to a cellular phone and may be a portable communication terminal such as a PDA (Personal Digital Assistant) having a communication function or PHS (Personal Handy-phone System).

What is claimed is:

1. A mobile communication terminal which is one of a handheld cellular phone, a PDA, and a PHS, and is moved between a plurality of areas, the mobile communication terminal comprising:
    a position-designating-section for designating at least one desired geographic position by a user prior to measuring a present position and issuing an instruction for map display, wherein the designated position is different from the present position of the terminal;
    a map-data-obtaining-section for requesting and obtaining prior to measuring the present position and issuing the instruction for map display, in a first location area different from the designated position, advance map data of the designated position via a communication network;
    a storage for storing prior to measuring the present position and issuing the instruction for map display the advance map data which is obtained in the first location area in advance of the terminal being in the designated position by the map-data-obtaining-section based on the designated position;
    an instruction-section for issuing the instruction for map display;
    a position-measurement-section for measuring the present position at which the instruction for map display has been issued from the instruction-section, and obtaining position data of the present position as present position data;
    a determination-section for determining whether the present position belongs to the first location area or a second location area other than the first location area; and
    a display-section for:
    displaying a map based on present map data, which is obtained by the map-data-obtaining-section and associated with the present position data, when the present position belongs to the first location area; and
    displaying a map based on the advance map data when the present position belongs to the second location area.

2. The mobile communication terminal as claimed in claim 1, wherein when the instruction for map display is issued from the instruction-section within the first location area, if the map-data-obtaining-section is accessible to the communication network, then the present map data is requested and obtained, and a map based on the present map data is displayed by the display-section.

3. The mobile communication terminal as claimed in claim 1, wherein when the instruction for map display is issued from the instruction-section within the second location area, if the map-data-obtaining-section is not accessible to the communication network, then a map based on the advance map data stored in the storage is displayed by the display-section.

4. The mobile communication terminal as claimed in claim 1, wherein the storage is searched for map data relating to the designated position, and a map based on the map data retrieved from the storage is displayed by the display-section.

5. The mobile communication terminal as claimed in claim 4, wherein when a start point and a destination are designated by the position-designating-section, the storage is searched for map data indicating a travel route from the start point to the destination, and a map based on the map data retrieved from the storage is displayed by the display-section.

6. The mobile communication terminal as claimed in claim 4, wherein when the map data relating to the designated position is not retrieved, map data relating to a position which is close to the designated position is searched for, and a map based on the map data retrieved from the storage is displayed by the display-section.

7. The mobile communication terminal as claimed in claim 1, wherein when the instruction for map display is issued from the instruction-section within the first location area, if no advance map data is stored in the storage and the map-data-obtaining-section is accessible to the communication network, the present map data is requested and obtained, and a map based on the present map data is displayed by the display-section.

8. The mobile communication terminal as claimed in claim 1, wherein the position-measurement-section measures the present position in accordance with the instruction for map display, issued from the instruction-section within the first location area.

9. The mobile communication terminal as claimed in claim 1, wherein the map-data-obtaining-section obtains the advance map data by requesting and obtaining map data relating to the designated position in advance via the communication network.

10. The mobile communication terminal as claimed in claim 9, wherein the map-data-obtaining-section obtains the advance map data by designating at least one of a place name, a station name, an airport name, and a facility name.

11. The mobile communication terminal as claimed in claim 1, wherein the map-data-obtaining-section obtains the present map data by designating at least one of a place name, a station name, an airport name, and a facility name.

12. The mobile communication terminal as claimed in claim 9, wherein when a start point and a destination are designated by the position-designating-section, the map-data-obtaining-section obtains the map data indicating a travel route from the start point to the destination, and the obtained map data is stored as the advance map data in the storage.

13. A map display system in which a server having map data and a mobile communication terminal for obtaining the map data are connected via a communication network, wherein:
the mobile communication terminal is one of a handheld cellular phone, a PDA, and a PHS, and is moved between a plurality of areas, and comprises:
a position-designating-section for designating at least one desired geographic position by a user prior to measuring a present position and issuing an instruction for map display, wherein the designated position is different from the present position of the terminal;
a map-data-obtaining-section for requesting and obtaining prior to measuring the present position and issuing the instruction for map display, in a first location area different from the designated position, advance map data of the designated position from the server via the communication network by sending the server the position data;
a first storage for storing prior to measuring the present position and issuing the instruction for map display the advance map data which is obtained in the first location area in advance of the terminal being in the designated position by the map-data-obtaining-section based on the designated position;
an instruction-section for issuing the instruction for map display;
a position-measurement-section for measuring the present position at which the instruction for map display has been issued from the instruction-section, and obtaining position data of the present position as present position data;
a determination-section for determining whether the present position belongs to the first location area or a second location area other than the first location area; and
a display-section for:
displaying a map based on present map data, which is obtained by the map-data-obtaining-section and associated with the present position data, when the present position belongs to the first location area; and
displaying a map based on the advance map data when the present position belongs to the second location area, wherein:
the server is provided in the first location area and comprises:
a second storage for storing map data; and
a map-providing-section for searching the stored map data in accordance with the position data sent from the mobile communication terminal and sending the mobile communication terminal map data corresponding to the position data.

14. The map display system as claimed in claim 13, wherein:
when a start point and a destination are designated by the mobile communication terminal, the server computes a travel route from the start point to the destination and sends the mobile communication terminal the travel route as the map data; and
the mobile communication terminal receives the map data and stores the received map data as the advance map data into the first storage.

15. The map display system as claimed in claim 13, wherein the server adjusts the map data to be sent to the mobile communication terminal in a manner such that a size of the map data does not exceed a predetermined value.

16. The map display system as claimed in claim 15, wherein the size of the map data is adjusted by controlling a scale of the map data.

17. The map display system as claimed in claim 13, wherein the map-data-obtaining-section obtains the advance map data by requesting and obtaining map data relating to the designated position from the server in advance via the communication network by sending position data relating to the designated position to the server.

18. The map display system as claimed in claim 17, wherein when map data requested by the map-data-obtaining-section is not stored in the second storage, the server retrieves map data relating to a position which is close to the designated position and sends the retrieved map data to the mobile communication terminal.

19. The mobile communication terminal as claimed in claim 1, wherein:
the first location area is a service area for performing wireless communication; and
the second location area is out of the service area.

20. The mobile communication terminal as claimed in claim 1, wherein:
the second location area is a roaming area for performing roaming access; and
the first location area is not the roaming area.

21. The mobile communication terminal as claimed in claim 1, wherein:
the first location area is a domestic area; and
the second location area is a foreign area.

22. The mobile communication terminal as claimed in claim 1, wherein:
the storage is a detachable external memory.

23. The mobile communication terminal as claimed in claim 22, wherein:
data associated with a store that sold the external memory is stored in the external memory in association with the advance map data.

24. The map display system as claimed in claim 13, wherein:
the first location area is a service area for performing wireless communication; and
the second location area is out of the service area.

25. The map display system as claimed in claim 13, wherein:
the second location area is a roaming area for performing roaming access; and
the first location area is not the roaming area.

26. The map display system as claimed in claim 13, wherein:
the first location area is a domestic area; and
the second location area is a foreign area.

27. The map display system as claimed in claim 13, wherein:
the first storage is a detachable external memory.

28. The map display system as claimed in claim 27, wherein:
data associated with a store that sold the external memory is stored in the external memory in association with the advance map data.

29. A mobile communication terminal which is one of a handheld cellular phone, a PDA, and a PHS, and is moved between a plurality of areas, the mobile communication terminal comprising:
a position-designating-section for designating at least one desired geographic position by a user prior to measuring a present position and issuing an instruction for map display, wherein the designated position is different from the present position of the terminal;
a map-data-obtaining-section for requesting and obtaining prior to measuring the present position and issuing the instruction for map display, in a first location area different from the designated position, advance map data of the designated position via a communication network;
a storage for storing prior to measuring the present position and issuing the instruction for map display the advance map data which is obtained in the first location area in advance of the terminal being in the designated position by the map-data-obtaining-section based on the designated position;
an instruction-section for issuing the instruction for map display;
a position-measurement-section for measuring the present position at which the instruction for map display has been issued from the instruction-section, and obtaining position data of the present position as present position data;
a determination-section that determines whether or not the present position data is included in the advance map data by searching the storage for the advance map data of the present position; and
a display-section that displays:
a map based on the advance map data when the present position data is included in the advance map data; and
a map based on present map data, which is obtained by the map-data-obtaining-section and associated with the present position data, when the present position data is not included in the advance map data.

* * * * *